(12) United States Patent
Johnson et al.

(10) Patent No.: US 10,309,420 B2
(45) Date of Patent: Jun. 4, 2019

(54) FAN

(71) Applicant: Dyson Technology Limited, Wiltshire (GB)

(72) Inventors: Jack Johnson, Bristol (GB); Jean-Baptiste Blanc, Bath (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 288 days.

(21) Appl. No.: 15/394,461

(22) Filed: Dec. 29, 2016

(65) Prior Publication Data

US 2017/0108010 A1 Apr. 20, 2017

Related U.S. Application Data

(63) Continuation of application No. 13/895,667, filed on May 16, 2013, now Pat. No. 9,568,006.

(30) Foreign Application Priority Data

May 16, 2012 (GB) .................................. 1208616.1

(51) Int. Cl.
*F04D 29/66* (2006.01)
*F04D 17/00* (2006.01)
(Continued)

(52) U.S. Cl.
CPC ........... *F04D 29/664* (2013.01); *F04D 17/00* (2013.01); *F04D 25/06* (2013.01); *F04D 25/08* (2013.01);
(Continued)

(58) Field of Classification Search
CPC .......... F04D 17/00; F04D 17/16; F04D 25/08; F04D 29/663; F04D 29/664;
(Continued)

(56) References Cited

U.S. PATENT DOCUMENTS 1,357,261 A 11/1920 Svoboda
1,767,060 A 6/1930 Ferguson
(Continued)

FOREIGN PATENT DOCUMENTS

AU 2011100923 9/2011
BE 560119 8/1957
(Continued)

OTHER PUBLICATIONS

Search Report dated Sep. 11, 2012, directed to GB Application No. 1208616.1; 1 page.
(Continued)

*Primary Examiner* — Carlos A Rivera
*Assistant Examiner* — Danielle M. Christensen
(74) *Attorney, Agent, or Firm* — Morrison & Foerster LLP

(57) ABSTRACT

A fan for generating an air current includes a body having an air inlet, and a nozzle connected to the body. The nozzle includes an interior passage for receiving an air flow from the body and an air outlet from which the air flow is emitted from the fan. The interior passage extends about an opening or bore through which air from outside the nozzle is drawn by air emitted from the air outlet. The body includes a duct having an air inlet and an air outlet, an impeller located within the duct for drawing the air flow through the duct, and a motor for driving the impeller. An annular guide member extends about the duct for guiding air from the air inlet of the body to the air inlet of the duct. The guide member defines with the duct an annular noise suppression cavity.

18 Claims, 10 Drawing Sheets

(51) Int. Cl.
*F04D 29/42* (2006.01)
*F04F 5/16* (2006.01)
*F04D 25/08* (2006.01)
*F04D 25/06* (2006.01)
*F04D 25/16* (2006.01)
*F04D 29/28* (2006.01)
*F04D 29/32* (2006.01)
*F04D 29/40* (2006.01)
*F04F 5/46* (2006.01)
*H02K 5/24* (2006.01)
*H02K 7/14* (2006.01)

(52) U.S. Cl.
CPC ........... *F04D 25/16* (2013.01); *F04D 29/281* (2013.01); *F04D 29/325* (2013.01); *F04D 29/403* (2013.01); *F04D 29/4226* (2013.01); *F04D 29/663* (2013.01); *F04D 29/665* (2013.01); *F04F 5/16* (2013.01); *F04F 5/46* (2013.01); *H02K 5/24* (2013.01); *H02K 7/14* (2013.01)

(58) Field of Classification Search
CPC .... F04D 29/4226; F04D 29/665; F04D 29/08; F04D 29/083; F04D 29/384; F04D 29/40; F04D 29/403; F04D 29/66; F04D 29/281; F04D 29/30; F04D 29/441; F04D 29/325; F04D 25/16; F04D 25/06; F05D 2260/963; F05D 2260/96; F05D 2240/128; F04F 5/46; F04F 5/16; H02K 5/24
See application file for complete search history.

(56) References Cited

U.S. PATENT DOCUMENTS

| | | |
|---|---|---|
| 1,896,869 A | 2/1933 | Larsh |
| 2,014,185 A | 9/1935 | Martin |
| 2,035,733 A | 3/1936 | Wall |
| D103,476 S | 3/1937 | Weber |
| 2,115,883 A | 5/1938 | Sher |
| 2,160,666 A * | 5/1939 | McMahan ............. F04D 29/281 181/207 |
| D115,344 S | 6/1939 | Chapman |
| 2,210,458 A | 8/1940 | Keilholtz |
| 2,258,961 A | 10/1941 | Saathoff |
| 2,336,295 A | 12/1943 | Reimuller |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,339,867 A | 9/1967 | Bayless |
| 3,444,817 A | 5/1969 | Caldwell |
| 3,503,138 A | 3/1970 | Fuchs et al. |
| 3,518,776 A | 7/1970 | Wolff et al. |
| 3,724,092 A | 4/1973 | McCleerey |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,541 A | 1/1980 | Beck et al. |
| 4,192,461 A | 3/1980 | Arborg |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,502,837 A | 3/1985 | Blair et al. |
| 4,568,243 A | 2/1986 | Schubert et al. |
| 4,630,475 A | 12/1986 | Mizoguchi |
| 4,643,351 A | 2/1987 | Fukamachi et al. |
| 4,653,976 A | 3/1987 | Blair et al. |
| 4,703,152 A | 10/1987 | Shih-Chin |
| 4,718,870 A | 1/1988 | Watts |
| 4,732,539 A | 3/1988 | Shin-Chin |
| 4,737,077 A | 4/1988 | Vera |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,402,938 A | 4/1995 | Sweeney |
| 5,407,324 A | 4/1995 | Starnes, Jr. et al. |
| 5,425,902 A | 6/1995 | Miller et al. |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,685,696 A | 11/1997 | Zangeneh et al. |
| 5,730,582 A | 3/1998 | Heitmann |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| D398,983 S | 9/1998 | Keller et al. |
| 5,841,080 A | 11/1998 | Lida et al. |
| 5,843,344 A | 12/1998 | Junket et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,056,518 A | 5/2000 | Allen et al. |
| 6,065,936 A | 5/2000 | Shingai et al. |
| 6,073,881 A | 6/2000 | Chen |
| 6,082,969 A | 7/2000 | Carroll et al. |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,338,610 B1 | 1/2002 | Harada et al. |
| 6,348,106 B1 | 2/2002 | Embree et al. |
| 6,386,845 B1 | 5/2002 | Bedard |

(56) References Cited

U.S. PATENT DOCUMENTS

| | | | |
|---|---|---|---|
| 6,454,527 B2 | 9/2002 | Nishiyama et al. |
| 6,480,672 B1 | 11/2002 | Rosenzweig et al. |
| 6,511,288 B1 | 1/2003 | Gatley, Jr. |
| 6,599,088 B2 | 7/2003 | Stagg |
| D485,895 S | 1/2004 | Melwani |
| 6,709,236 B1 | 3/2004 | Hoelzer |
| 6,752,711 B1 | 6/2004 | Yeung |
| 6,789,787 B2 | 9/2004 | Stutts |
| 6,830,433 B2 | 12/2004 | Birdsell et al. |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,186,075 B2 | 3/2007 | Winkler et al. |
| 7,189,053 B2 | 3/2007 | Winkler et al. |
| 7,241,214 B2 | 7/2007 | Sixsmith |
| 7,317,267 B2 | 1/2008 | Schmid et al. |
| 7,455,504 B2 | 11/2008 | Hill et al. |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,664,377 B2 | 2/2010 | Liao |
| D614,280 S | 4/2010 | Dyson et al. |
| 7,775,848 B1 | 8/2010 | Auerbach |
| 7,806,388 B2 | 10/2010 | Junkel et al. |
| 7,921,962 B2 | 4/2011 | Liddell |
| 8,033,783 B2 | 10/2011 | Ishikawa et al. |
| 8,092,166 B2 | 1/2012 | Nicolas et al. |
| 8,430,624 B2 | 4/2013 | Cookson et al. |
| 8,469,658 B2 | 6/2013 | Gammack et al. |
| 2002/0015640 A1 | 2/2002 | Nishiyama et al. |
| 2002/0106547 A1 | 8/2002 | Sugawara et al. |
| 2003/0059307 A1 | 3/2003 | Moreno et al. |
| 2003/0171093 A1 | 9/2003 | Gumucio Del Pozo |
| 2003/0228226 A1 | 12/2003 | Higashimori et al. |
| 2004/0022631 A1 | 2/2004 | Birdsell et al. |
| 2004/0049842 A1 | 3/2004 | Prehodka |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0132529 A1 | 6/2005 | Davidshofer |
| 2005/0163670 A1 | 7/2005 | Alleyne et al. |
| 2005/0173997 A1 | 8/2005 | Schmid et al. |
| 2005/0276684 A1 | 12/2005 | Huang et al. |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2007/0035189 A1 | 2/2007 | Matsumoto |
| 2007/0041857 A1 | 2/2007 | Fleig |
| 2007/0048159 A1 | 3/2007 | DiMatteo et al. |
| 2007/0059179 A1 | 3/2007 | Xu |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0269323 A1 | 11/2007 | Zhou et al. |
| 2008/0020698 A1 | 1/2008 | Spaggiari |
| 2008/0152482 A1 | 6/2008 | Patel |
| 2008/0166224 A1 | 7/2008 | Giffin |
| 2008/0286130 A1 | 11/2008 | Purvines |
| 2008/0304986 A1 | 12/2008 | Kenyon et al. |
| 2008/0314250 A1 | 12/2008 | Cowie et al. |
| 2009/0026850 A1 | 1/2009 | Fu |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0191054 A1 | 7/2009 | Winkler |
| 2009/0214341 A1 | 8/2009 | Craig |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0189557 A1 | 7/2010 | Broom |
| 2010/0219013 A1 | 9/2010 | Liddell |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1* | 9/2010 | Dyson ................. F04F 5/16 415/90 |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |
| 2010/0254800 A1 | 10/2010 | Fitton et al. |
| 2011/0002775 A1 | 1/2011 | Ma et al. |
| 2011/0058935 A1 | 3/2011 | Gammack et al. |
| 2011/0097194 A1* | 4/2011 | Schick ................. F01D 25/26 415/119 |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0051889 A1 | 3/2012 | Gamissans |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0114513 A1 | 5/2012 | Simmonds et al. |
| 2012/0230658 A1 | 9/2012 | Fitton et al. |
| 2013/0011252 A1 | 1/2013 | Crawford et al. |
| 2013/0045084 A1 | 2/2013 | Tu et al. |
| 2013/0189083 A1 | 7/2013 | Atkinson |
| 2013/0302156 A1 | 11/2013 | Nurzynski |
| 2013/0309065 A1 | 11/2013 | Johnson et al. |
| 2013/0309066 A1 | 11/2013 | Atkinson et al. |
| 2013/0309080 A1 | 11/2013 | Johnson et al. |
| 2013/0323025 A1 | 12/2013 | Crawford et al. |
| 2014/0017069 A1 | 1/2014 | Peters |
| 2017/0108011 A1 | 4/2017 | Johnson et al. |

FOREIGN PATENT DOCUMENTS

| | | |
|---|---|---|
| CA | 1055344 | 5/1979 |
| CA | 2155482 | 9/1996 |
| CH | 346643 | 5/1960 |
| CN | 2085866 | 10/1991 |
| CN | 2111392 | 7/1992 |
| CN | 2228996 | 6/1996 |
| CN | 1232143 | 10/1999 |
| CN | 1288506 | 3/2001 |
| CN | 1336482 | 2/2002 |
| CN | 1437300 | 8/2003 |
| CN | 2650005 | 10/2004 |
| CN | 2713643 | 7/2005 |
| CN | 1680727 | 10/2005 |
| CN | 2833197 | 11/2006 |
| CN | 101046318 | 10/2007 |
| CN | 201180678 | 1/2009 |
| CN | 201221477 | 4/2009 |
| CN | 201281416 | 7/2009 |
| CN | 201349269 | 11/2009 |
| CN | 101749288 | 6/2010 |
| CN | 201502549 | 6/2010 |
| CN | 101816534 | 9/2010 |
| CN | 101825095 | 9/2010 |
| CN | 101825102 | 9/2010 |
| CN | 201568337 | 9/2010 |

(56) References Cited

FOREIGN PATENT DOCUMENTS

| | | |
|---|---|---|
| CN | 101936310 | 1/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201779080 | 3/2011 |
| CN | 201802648 | 4/2011 |
| CN | 102095236 | 6/2011 |
| CN | 102305220 | 1/2012 |
| CN | 102367813 | 3/2012 |
| CN | 202165330 | 3/2012 |
| CN | 203272077 | 11/2013 |
| CN | 103423178 | 5/2016 |
| DE | 1 291 090 | 3/1969 |
| DE | 24 51 557 | 5/1976 |
| DE | 27 48 724 | 5/1978 |
| DE | 3644567 | 7/1988 |
| DE | 41 27 134 | 2/1993 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| DE | 10 2009 044 349 | 5/2011 |
| EP | 0 044 494 | 1/1982 |
| EP | 0 186 581 | 7/1986 |
| EP | 0 837 245 | 4/1998 |
| EP | 0 955 469 | 11/1999 |
| EP | 1 094 224 | 4/2001 |
| EP | 1 138 954 | 10/2001 |
| EP | 1 566 548 | 8/2005 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| FR | 1033034 | 7/1953 |
| FR | 1119439 | 6/1956 |
| FR | 1.387.334 | 1/1965 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863 124 | 3/1961 |
| GB | 1067956 | 5/1967 |
| GB | 1085565 | 10/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 237 323 | 5/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468319 | 9/2010 |
| GB | 2468320 | 9/2010 |
| GB | 2468323 | 9/2010 |
| GB | 2468328 | 9/2010 |
| GB | 2468331 | 9/2010 |
| GB | 2468369 | 9/2010 |
| GB | 2473037 | 3/2011 |
| GB | 2479760 | 10/2011 |
| GB | 2482547 | 2/2012 |
| GB | 2482548 | 2/2012 |
| JP | 31-13055 | 8/1956 |
| JP | 35-4369 | 3/1960 |
| JP | 39-7297 | 3/1964 |
| JP | 49-150403 | 12/1974 |
| JP | 51-7258 | 1/1976 |
| JP | 53-51608 | 5/1978 |
| JP | 53-60100 | 5/1978 |
| JP | 56-167897 | 12/1981 |
| JP | 57-71000 | 5/1982 |
| JP | 57-157097 | 9/1982 |
| JP | 59-90797 | 5/1984 |
| JP | 59-167984 | 11/1984 |
| JP | 60-105896 | 7/1985 |
| JP | 61-31830 | 2/1986 |
| JP | 61-116093 | 6/1986 |
| JP | 61-280787 | 12/1986 |
| JP | 62-223494 | 10/1987 |
| JP | 63-179198 | 7/1988 |
| JP | 63-306340 | 12/1988 |
| JP | 64-21300 | 2/1989 |
| JP | 64-83884 | 3/1989 |
| JP | 1-138399 | 5/1989 |
| JP | 1-224598 | 9/1989 |
| JP | 2-146294 | 6/1990 |
| JP | 2-211400 | 8/1990 |
| JP | 2-218890 | 8/1990 |
| JP | 2-248690 | 10/1990 |
| JP | 3-3419 | 1/1991 |
| JP | 3-52515 | 5/1991 |
| JP | 3-267598 | 11/1991 |
| JP | 4-43895 | 2/1992 |
| JP | 4-366330 | 12/1992 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 7-247991 | 9/1995 |
| JP | 8-21400 | 1/1996 |
| JP | 9-100800 | 4/1997 |
| JP | 9-287600 | 11/1997 |
| JP | 10-122188 | 5/1998 |
| JP | 11-227866 | 8/1999 |
| JP | 2000-116179 | 4/2000 |
| JP | 2000-201723 | 7/2000 |
| JP | 2001-17358 | 1/2001 |
| JP | 2001-140796 | 5/2001 |
| JP | 2001-295785 | 10/2001 |
| JP | 2002-21797 | 1/2002 |
| JP | 2002-138829 | 5/2002 |
| JP | 2002-213388 | 7/2002 |
| JP | 2002-371998 | 12/2002 |
| JP | 2003-329273 | 11/2003 |

(56) References Cited

FOREIGN PATENT DOCUMENTS

| | | |
|---|---|---|
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 3127331 | 11/2006 |
| JP | 2007-92697 | 4/2007 |
| JP | 2007-138763 | 6/2007 |
| JP | 2007-138789 | 6/2007 |
| JP | 2008-39316 | 2/2008 |
| JP | 2008-100204 | 5/2008 |
| JP | 2008-151081 | 7/2008 |
| JP | 3146538 | 10/2008 |
| JP | 2008-294243 | 12/2008 |
| JP | 2009-44568 | 2/2009 |
| JP | 2009-264121 | 11/2009 |
| JP | 2010-131259 | 6/2010 |
| JP | 2012-36897 | 2/2012 |
| JP | 2012-57619 | 3/2012 |
| KR | 2002-0061691 | 7/2002 |
| KR | 2002-0067468 | 8/2002 |
| KR | 10-2005-0102317 | 10/2005 |
| KR | 10-2007-0007997 | 1/2007 |
| KR | 10-2010-0055611 | 5/2010 |
| KR | 2000-0032363 | 6/2010 |
| KR | 10-0985378 | 9/2010 |
| TW | M394383 | 12/2010 |
| TW | M407299 | 7/2011 |
| WO | WO-90/13478 | 11/1990 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2009/030879 | 3/2009 |
| WO | WO-2009/030881 | 3/2009 |
| WO | WO-2010/100448 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/055134 | 5/2011 |

OTHER PUBLICATIONS

International Search Report and Written Opinion dated Feb. 26, 2014, directed to International Application No. PCT/GB2013/050990; 16 pages.
Reba, I. (1966). "Applications of the Coanda Effect," *Scientific American* 214:84-92.
Third Party Submission Under 37 CFR 1.99 filed Jun. 2, 2011, directed towards U.S. Appl. No. 12/203,698; 3 pages.
Gammack et al., U.S. Office Action dated Dec. 9, 2010, directed to U.S. Appl. No. 12/203,698; 10 pages.
Gammack et al., U.S. Office Action dated Jun. 21, 2011, directed to U.S. Appl. No. 12/203,698; 11 pages.
Gammack et al., U.S. Office Action dated Sep. 17, 2012, directed to U.S. Appl. No. 13/114,707; 12 pages.
Gammack et al., U.S. Office Action dated Dec. 10, 2010, directed to U.S. Appl. No. 12/230,613; 12 pages.
Gammack et al., U.S. Office Action dated May 13, 2011, directed to U.S. Appl. No. 12/230,613; 13 pages.
Gammack et al., U.S. Office Action dated Sep. 7, 2011, directed to U.S. Appl. No. 12/230,613; 15 pages.
Gammack et al., U.S. Office Action dated Jun. 8, 2012, directed to U.S. Appl. No. 12/230,613; 15 pages.
Gammack et al., U.S. Office Action dated Aug. 20, 2012, directed to U.S. Appl. No. 12/945,558; 15 pages.
Fitton et al., U.S. Office Action dated Nov. 30, 2010 directed to U.S. Appl. No. 12/560,232; 9 pages.
Nicolas et al., U.S. Office Action dated Mar. 7, 2011, directed to U.S. Appl. No. 12/622,844; 10 pages.
Nicolas et al., U.S. Office Action dated Sep. 8, 2011, directed to U.S. Appl. No. 12/622,844; 11 pages.
Gammack et al., U.S. Office Action dated Dec. 9, 2010, directed to U.S. Appl. No. 12/716,781; 17 pages.
Gammack et al., U.S. Office Action dated Jun. 24, 2011, directed to U.S. Appl. No. 12/716,781; 19 pages.
Fitton et al., U.S. Office Action dated Mar. 30, 2012, directed to U.S. Appl. No. 12/716,707; 7 pages.
Gammack et al., U.S. Office Action dated Nov. 29, 2012, directed to U.S. Appl. No. 12/716,742; 9 pages.
Cookson et al., U.S. Office Action dated Dec. 19, 2012, directed to U.S. Appl. No. 12/716,778; 8 pages.
Hodgson et al., U.S. Office Action dated Mar. 24, 2014, directed to U.S. Appl. No. 13/207,212; 10 pages.
Gammack et al., U.S. Office Action dated Apr. 12, 2011, directed to U.S. Appl. No. 12/716,749; 8 pages.
Gammack et al., U.S. Office Action dated Sep. 1, 2011, directed to U.S. Appl. No. 12/716,749; 9 pages.
Gammack et al., U.S. Office Action dated Jun. 25, 2012, directed to U.S. Appl. No. 12/716,749; 11 pages.
Gammack et al., U.S. Office Action dated May 24, 2011, directed to U.S. Appl. No. 12/716,613; 9 pages.
Fitton et al., U.S. Office Action dated Mar. 8, 2011, directed to U.S. Appl. No. 12/716,780; 12 pages.
Fitton et al., U.S. Office Action dated Sep. 6, 2011, directed to U.S. Appl. No. 12/716,780; 16 pages.
Atkinson, U.S. Office Action dated Sep. 18, 2015, directed to U.S. Appl. No. 13/743,975; 8 pages.
Nurzynski, U.S. Office Action dated Jun. 28, 2016, directed to U.S. Appl. No. 13/991,121; 20 pages.
Atkinson et al., U.S. Office Action dated Dec. 17, 2015, directed to U.S. Appl. No. 13/895,691; 11 pages.
Atkinson et al., U.S. Office Action dated Sep. 21, 2016, directed to U.S. Appl. No. 13/895,691; 10 pages.
Atkinson et al., U.S. Office Action dated Apr. 19, 2017, directed to U.S. Appl. No. 13/895,691; 10 pages.
Johnson et al., U.S. Office Action dated Feb. 12, 2016, directed to U.S. Appl. No. 13/895,667; 13 pages.
Johnson et al., U.S. Office Action dated Feb. 12, 2016, directed to U.S. Appl. No. 13/895,690; 14 pages.
Atkinson et al., U.S. Office Action dated Oct. 19, 2017, directed to U.S. Appl. No. 13/895,691; 10 pages.
Atkinson et al., U.S. Office Action dated Jul. 25, 2018, directed to U.S. Appl. No. 13/895,691; 11 pages.
Johnson et al., U.S. Office Action dated Jan. 11, 2019, directed to U.S. Appl. No. 15/394,474; 14 pages.
European Search Report dated Nov. 15, 2018, directed to EP Application No. 18 18 7246.6; 10 pages.

* cited by examiner

FAN

REFERENCE TO RELATED APPLICATIONS

This application is a continuation of U.S. patent application Ser. No. 13/895,667, filed May 16, 2013, which claims the priority of United Kingdom Application No. 1208616.1, filed May 16, 2012, the entire contents of which are incorporated herein by reference.

FIELD OF THE INVENTION

The present invention relates to a fan. Particularly, but not exclusively, the present invention relates to a floor or table-top fan, such as a desk, tower or pedestal fan.

BACKGROUND OF THE INVENTION

A conventional domestic fan typically includes a set of blades or vanes mounted for rotation about an axis, and drive apparatus for rotating the set of blades to generate an air flow. The movement and circulation of the air flow creates a 'wind chill' or breeze and, as a result, the user experiences a cooling effect as heat is dissipated through convection and evaporation. The blades are generated located within a cage which allows an air flow to pass through the housing while preventing users from coming into contact with the rotating blades during use of the fan.

WO 2009/030879 describes a fan assembly which does not use caged blades to project air from the fan assembly. Instead, the fan assembly comprises a cylindrical base which houses a motor-driven impeller for drawing a primary air flow into the base, and an annular nozzle connected to the base and comprising an annular air outlet through which the primary air flow is emitted from the fan. The nozzle defines a central opening through which air in the local environment of the fan assembly is drawn by the primary air flow emitted from the mouth, amplifying the primary air flow.

WO 2010/100452 also describes such a fan assembly. Within the base, the impeller is located within an impeller housing, and the motor for driving the impeller is located within a motor bucket which is mounted on the impeller housing. The impeller housing is supported within the base by a plurality of angularly spaced supports. Each support is, in turn, mounted on a respective support surface extending radially inwardly from the inner surface of the base. In order to provide an air tight seal between the impeller housing and the base, a lip seal is located on an external side surface of the impeller housing for engaging the internal side surface of the base.

Silencing foam is provided for reducing noise emissions from the base. A first disc-shaped foam member is located beneath the impeller housing, and a second, ring-shaped foam member is located within the motor bucket.

SUMMARY OF THE INVENTION

In a first aspect, the present invention provides a fan for generating an air current, comprising a body comprising an air inlet, and a nozzle connected to the body, the nozzle comprising an interior passage for receiving an air flow from the body and at least one air outlet from which the air flow is emitted from the fan, the interior passage extending about an opening through which air from outside the nozzle is drawn by air emitted from said at least one air outlet, the body comprising a duct having an air inlet and an air outlet, an impeller located within the duct for drawing the air flow through the duct, and a motor for driving the impeller, the body defining an air flow path extending from the air inlet of the body to the air outlet of the duct, wherein the body further comprises a noise suppression cavity located beneath the air inlet of the duct, the cavity having an inlet which is located beneath, and preferably concentric with, the air inlet of the duct.

The provision of a noise suppression cavity located beneath the air inlet of the duct can further reduce noise emissions from this type of fan. The size of the noise suppression cavity is preferably tuned to the wavelength of the rotational tone of the impeller so that the noise suppression cavity can act as a resonator to target a specific wavelength of the noise generated during the use of the fan, as well as generally reduce noise levels.

The body preferably comprises at least one wall, more preferably a plurality of walls, at least partially delimiting the noise suppression cavity, with the inlet of the cavity being located in said at least one wall of the body. The noise suppression cavity is preferably delimited by an upper wall and a lower wall, with the inlet of the noise suppression cavity being located in the upper wall. The body preferably comprises a lower section and an upper section which is mounted on the lower section for movement relative thereto. This can allow the upper section of the body and the nozzle to be tilted relative to the lower section to adjust the direction of the air current generated by the fan. The air inlet of the body and the duct are preferably located in the upper section of the body. The upper section of the body preferably has a bottom wall which partially delimits the noise suppression cavity by providing the lower wall of the noise suppression cavity. By utilising the bottom wall of the upper section of the body partially to delimit the noise suppression cavity, the overall size of the body can be minimized. The bottom wall of the upper section of the body is preferably concave in shape. The upper wall is preferably substantially planar in shape. The air inlet and the upper wall of the noise suppression cavity are preferably defined by an annular plate which is located over the bottom wall of the upper section of the body.

To reduce the level of broadband noise emitted from the fan, the body preferably comprises an annular sound absorbing member located between the duct and the noise suppression cavity. The annular sound absorbing member is preferably concentric with the inlet of the noise suppression cavity, and preferably has an outer periphery which is in contact with a tubular or cylindrical casing of the body in which the air inlet is formed. A sheet or disc of sound absorbing material may be disposed over the annular sound absorbing member to inhibit the ingress of dust into the noise suppression cavity. The thickness of this sheet of sound absorbing material is preferably smaller that the thickness of the annular sound absorbing member upon which it is located. For example, the annular sound absorbing member may have a thickness of around 5 mm, whereas the sheet of sound absorbing material may have a thickness of around 1 mm.

The body preferably comprises annular guide means extending about the duct for guiding air from the air inlet of the body to the air inlet of the duct. The guide means is preferably located between the duct and the outer casing of the body, in which the air inlet is formed, so as to define in part a tortuous air flow path between the air inlet of the body and the air inlet of the duct. The guide means thus serves to block any direct path for noise passing from the air inlet of the duct towards the air inlet of the body.

The guide means preferably defines with the duct an annular noise suppression cavity extending about the duct, and so in a second aspect the present invention provides a fan for generating an air current, comprising a body comprising an air inlet, and a nozzle connected to the body, the nozzle comprising an interior passage for receiving an air flow from the body and at least one air outlet from which the air flow is emitted from the fan, the interior passage extending about an opening through which air from outside the nozzle is drawn by air emitted from said at least one air outlet, the body comprising a duct having an air inlet and an air outlet, an impeller located within the duct for drawing the air flow through the duct, and a motor for rotating the impeller about a rotational axis, the body defining an air flow path extending from the air inlet of the body to the air outlet of the duct, wherein the body further comprises annular guide means extending about the duct for guiding air from the air inlet of the body to the air inlet of the duct, and wherein the guide means defines with the duct an annular noise suppression cavity.

Preferably, a surface of the guide means which is exposed to the air flow through the body is at least partially lined with sound-absorbing material to reduce the level of broadband noise emitted from the fan. The annular noise suppression cavity preferably has an inlet at least partially defined by the guide means. This inlet is preferably located between the air inlet of the duct and the guide means. The inlet is preferably annular in shape. The inlet of the annular noise suppression cavity is preferably located at the lowermost extremity of the annular noise suppression cavity, and thus at a position at which the tortuous section of the air flow path turns through an angle which is greater than 90° from a direction extending away from the air inlet of the body to a direction extending towards the air inlet of the duct. The size of the annular noise suppression cavity is also preferably tuned to the wavelength of the rotational tone of the impeller so that the noise suppression cavity can act as a resonator to target a specific wavelength of the noise generated during the use of the fan, as well as generally reduce noise levels.

The guide means is preferably inclined relative to the rotational axis of the impeller so that the guide means tapers towards a lower surface of the body. The guide means is preferably in the form of, or comprises, a substantially conical guide member. The guide member preferably depends from an annular rib extending between the body and the duct.

The air inlet of the body preferably comprises an array of apertures formed in the outer casing of the body. The array of apertures preferably extends about the guide means and/or the duct. Preferably, the internal surface of the casing of the body is at least partially lined with sound-absorbing material. For example, an annular sheet of sound-absorbing material may be located downstream of the air inlet to reduce the level of broadband noise emitted through the air inlet of the body.

The air inlet of the duct is preferably outwardly flared to guide the air flow into the duct, and thereby minimise turbulence within the duct upstream of the impeller. The duct preferably comprises an inner wall and an outer wall extending about the inner wall. The inner wall of the duct preferably forms at least part of a motor housing for housing the motor. Preferably, a portion of the inner wall of the duct is perforated and lined internally with sound-absorbing material. The perforated portion of the inner wall is preferably frusto-conical in shape, and tapers towards the outlet of the duct. A section of the duct adjacent to this perforated portion of the inner wall preferably houses a diffuser.

The diffuser is in the form of a plurality of curved stationary blades arranged about the rotational axis of the impeller. Each blade preferably have a leading edge located adjacent the impeller, a trailing edge located adjacent the air outlet of the duct, an inner side edge connected to and extending partially about the outer surface of the inner wall, and an outer side edge located opposite to the inner side edge and connected to the outer wall. The inner side edges of the blades of the diffuser are preferably integral with the inner wall, whereas the outer side edges of the blades of the diffuser are preferably connected to the outer wall, for example using an adhesive.

To generate a smooth air flow through the diffuser, and thus minimize noise generated through the passage of the air flow through the diffuser, the variation in the cross-sectional area of the air flow path passing through the diffuser, as formed from the intersection with the duct of a plane which extends orthogonally through the rotational axis of the impeller, is preferably no greater than 50%, more preferably no greater than 20%, and even more preferably no greater than 10%, of the cross-sectional area of the air flow path at the inlet of the diffuser. Thus, in a third aspect the present invention provides a fan for generating an air current, comprising a body comprising an air inlet, and a nozzle connected to the body, the nozzle comprising an interior passage for receiving an air flow from the body and at least one air outlet from which the air flow is emitted from the fan, the interior passage extending about an opening through which air from outside the nozzle is drawn by air emitted from said at least one air outlet, the body comprising a duct having an air inlet and an air outlet, an impeller located within the duct for drawing the air flow through the duct, a motor for rotating the impeller about a rotational axis, and a diffuser located within the duct downstream of the impeller, the body defining an air flow path extending from the air inlet of the body to the air outlet of the duct, and wherein a diffuser section of the air flow path extends from an inlet of the diffuser to an outlet of the diffuser, the diffuser section of the air flow path being annular in shape and converging towards the outlet end of the diffuser, the diffuser section of the air flow path having a cross-sectional area formed from the intersection with the duct of a plane which extends orthogonally through the rotational axis of the impeller, and wherein the variation in the cross-sectional area of the air flow path along the diffuser section is no greater than 20% of the cross-sectional area of the air flow path at the inlet of the diffuser.

The duct is preferably mounted on an annular seat located within the body. The body preferably comprises an annular seal in sealing engagement with the duct and the seat. The compression of the annular seal between the duct and the seat forms an air tight seal which prevents air from leaking back towards the air inlet of the duct along a path extending between the casing and the duct, and so forces the pressurized air flow generated by the impeller to pass to the interior passage of the nozzle. The annular seal is preferably formed from material which exhibits no more than 0.01 MPa of stress at 10% compression. The annular seal is preferably a foam annular seal. Forming the annular seal from a foam material, as opposed to an elastomeric or rubber material, can reduce the transmission of vibrations to the casing through the annular seal. In a preferred embodiment, the annular seal is formed from a closed cell foam material. The foam material is preferably formed from a synthetic rubber, such as EPDM (ethylene propylene diene monomer) rubber.

The compressive force acting on the annular seal is preferably aligned with the direction of the greatest stiffness of the surface from which the vibrations are to be isolated, that is, the outer casing of the fan. In a preferred embodiment, this direction is parallel to the rotational axis of the impeller. The annular seal is preferably spaced from the inner surface of the casing so that vibrations are not transferred radially outwardly from the annular seal to the casing.

Any excessive compression of the annular seal between the duct and the seat could result in an undesirable increase in the transmission of the vibrations from the motor housing to the casing through the annular seal, and so at least one resilient support may be provided between the duct and the seat to reduce the compressive load applied to the annular seal, and so reduce the extent of the deformation of the annular seal.

The impeller is preferably a mixed flow impeller. The impeller preferably comprises a substantially conical hub connected to the motor, and a plurality of blades connected to the hub, with each blade comprising a leading edge located adjacent the air inlet of the impeller housing, a trailing edge, an inner side edge connected to and extending partially about the outer surface of the hub, an outer side edge located opposite to the inner side edge, and a blade tip located at the intersection of the leading edge and the outer side edge. The leading edge preferably comprises an inner portion located adjacent the hub, and an outer portion located adjacent the blade tip, with the inner portion being swept rearwardly from the hub to the outer portion, and the outer portion being swept forwardly from the inner portion to the blade tip. The localised forward sweep of the leading edge of each blade towards the blade tip can reduce the peak hub-to-tip loading of the blades, which peak is located generally at or towards the leading edges of the blades. Blade-to-blade loading at the leading edge of the blade can be reduced by increasing the length of the inner side edge of the blade so that the length of the inner side edge approaches that of the outer side edge, resulting in the inner portion of the leading edge being swept rearwardly from the hub to the outer portion. The inner portion of the leading edge is preferably convex, whereas the outer portion of the leading edge is preferably concave.

To avoid conductance losses in the air flow as the air flow passes from the air outlet of the duct to the nozzle, the air outlet of the duct is preferably located within the interior passage of the nozzle. Therefore, in a fourth aspect, the present invention provides a fan for generating an air current, comprising a body comprising an air inlet, and a nozzle connected to the body, the nozzle comprising an interior passage and at least one air outlet from which the air flow is emitted from the fan, the interior passage extending about an opening through which air from outside the nozzle is drawn by air emitted from said at least one air outlet, the body comprising a duct having a first end defining an air inlet of the duct and a second end located opposite to the first end and defining an air outlet of the duct, an impeller located within the duct for drawing the air flow through the duct, and a motor for driving the impeller, wherein the second end of the duct protrudes from the body into the interior passage of the nozzle.

The nozzle is preferably configured such that the interior passage has a first section and a second section each for receiving a respective portion of the air flow entering the interior passage from the body, and for conveying the portions of the air flow in opposite angular directions about the opening. At least a portion of the second end of the duct is outwardly flared to guide the respective portions of the air flow into the sections of the interior passage. Therefore in a fifth aspect, the present invention provides a fan for generating an air current, comprising a body comprising an air inlet, and a nozzle connected to the body, the nozzle comprising an interior passage and at least one air outlet from which the air flow is emitted from the fan, the interior passage extending about an opening through which air from outside the nozzle is drawn by air emitted from said at least one air outlet, the interior passage having a first section and a second section each for receiving a respective portion of an air flow entering the interior passage from the body, and for conveying the portions of the air flow in opposite angular directions about the opening, the body comprising a duct having a first end defining an air inlet of the duct and a second end located opposite to the first end and defining an air outlet of the duct, an impeller located within the duct for drawing the air flow through the duct, and a motor for driving the impeller, wherein at least a portion of the second end of the duct is outwardly flared to guide each portion of the air flow into a respective section of the nozzle.

The second end of the duct preferably has first and second flared portions each configured to guide a portion of the air flow into a respective section of the interior passage. The nozzle preferably comprises an annular casing which defines the interior passage and the air outlet(s) of the nozzle, and the end of each flared portion preferably has a curvature which is approximately the same as that of a contiguous portion of the casing. The separation between the end of each flared portion and its contiguous portion of the casing is preferably no greater than 10 mm, more preferably no greater than 5 mm so that there is minimal disruption to the profile of the air flow as it enters the interior passage of the nozzle.

The nozzle preferably comprises an annular inner wall, and an outer wall extending about the inner wall, with the interior passage being located between the inner wall and the outer wall. The inner wall at least partially defines the opening through which air from outside the nozzle is drawn by air emitted from said at least one air outlet.

The inner wall is preferably eccentric with respect to the outer wall so that each section of the interior passage has a cross-sectional area formed from the intersection with the interior passage by a plane which extends through and contains the longitudinal axis of the outer wall, and which decreases in size about the opening. The cross-sectional area of each section of the interior passage may decrease gradually, or taper, about the opening. The nozzle is preferably substantially symmetrical about a plane passing through the air inlet and the centre of the nozzle, and so each section of the interior passage preferably has the same variation in cross-sectional area. For example, the nozzle may have a generally circular, elliptical or "race-track" shape, in which each section of the interior passage comprises a relatively straight section located on a respective side of the opening.

The variation in the cross-sectional area of each section of the interior passage is preferably such that the cross-sectional area decreases in size about the opening. The cross-sectional area of each section preferably has a maximum value at the portion of that section which receives a portion of the air flow from the duct, and a minimum value located diametrically opposite the duct. The variation in the cross-sectional area can not only minimise any variation in static pressure within the interior passage, but can also enable the interior passage to accommodate the flared end of the duct.

The at least one air outlet is preferably located between the inner wall and the outer wall. For example, the at least one air outlet may be located between overlapping portions of the inner wall and the outer wall. These overlapping portions of the walls may comprise part of an internal surface of the inner wall, and part of an external surface of the outer wall. Alternatively, these overlapping portions of the walls may comprise part of an internal surface of the outer wall, and part of an external surface of the inner wall.

Features described above in connection with the first aspect of the invention are equally applicable to each of the second to fifth aspects of the invention, and vice versa.

BRIEF DESCRIPTION OF THE DRAWINGS

Preferred features of the invention will now be described, by way of example only, with reference to the accompanying drawings, in which.

DETAILED DESCRIPTION OF THE INVENTION

Figure 1:
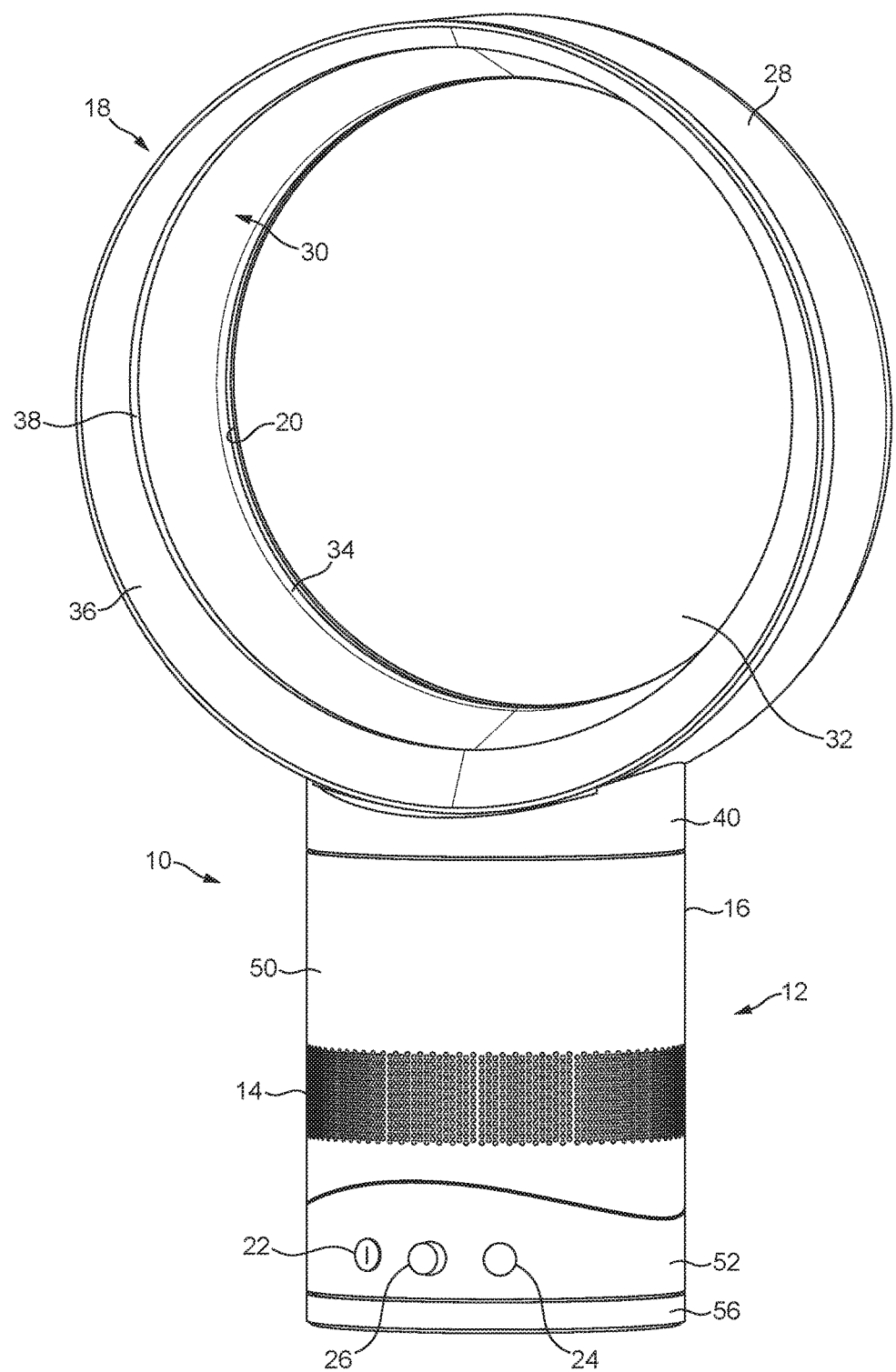
FIG. 1 is a front perspective view of a fan.
Figure 2:
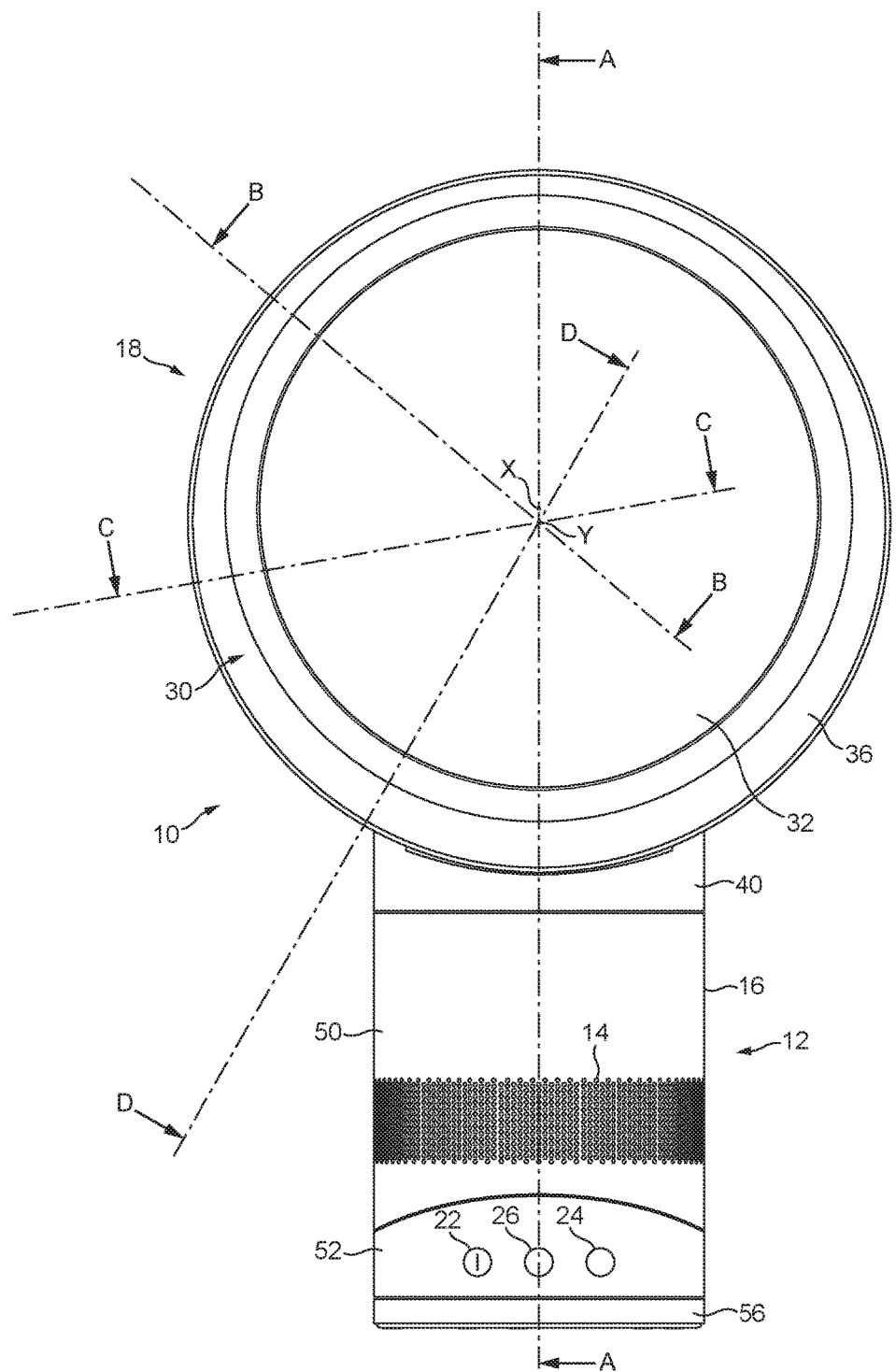
FIG. 2 is a front view of the fan.

FIGS. 1 and 2 are external views of a fan 10. The fan comprises a body 12 having an air inlet 14 in the form of a plurality of apertures formed in the outer casing 16 of the body 12, and through which a primary air flow is drawn into the body 12 from the external environment. An annular nozzle 18 having an air outlet 20 for emitting the primary air flow from the fan 10 is connected to the body 12. The body 12 further comprises a user interface for allowing a user to control the operation of the fan 10. The user interface comprises a plurality of user-operable buttons 22, 24 and a user-operable dial 26.

The nozzle 18 has an annular shape. The nozzle 18 comprises an outer wall 28 extending about an annular inner wall 30. In this example, each of the walls 28, 30 is formed from a separate component. Each of the walls 28, 30 has a front end and a rear end. With reference also to FIG. 4(a), the rear end of the outer wall 28 curves inwardly towards the rear end of the inner wall 30 to define a rear end of the nozzle 18. The front end of the inner wall 30 is folded outwardly towards the front end of the outer wall 28 to define a front end of the nozzle 18. The front end of the outer wall 28 is inserted into a slot located at the front end of the inner wall 30, and is connected to the inner wall 30 using an adhesive introduced to the slot.

The inner wall 30 extends about an axis, or longitudinal axis, X to define a bore, or opening, 32 of the nozzle 18. The bore 32 has a generally circular cross-section which varies in diameter along the axis X from the rear end of the nozzle 18 to the front end of the nozzle 18.

The inner wall 30 is shaped so that the external surface of the inner wall 30, that is, the surface that defines the bore 32, has a number of sections. The external surface of the inner wall 30 has a convex rear section 34, an outwardly flared frusto-conical front section 36 and a cylindrical section 38 located between the rear section 34 and the front section 36.

The outer wall 28 comprises a base 40 which is connected to an open upper end of the body 12, and which has an open lower end which provides an air inlet for receiving the primary air flow from the body 12. The majority of the outer wall 28 is generally cylindrical shape. The outer wall 28 extends about a central axis, or longitudinal axis, Y which is parallel to, but spaced from, the axis X. In other words, the outer wall 28 and the inner wall 30 are eccentric. In this example, the axis X is located above the axis Y, with each of the axes X, Y being located in a plane which extends vertically through the centre of the fan 10.

The rear end of the outer wall 28 is shaped to overlap the rear end of the inner wall 30 to define the air outlet 20 of the nozzle 18 between the inner surface of the outer wall 28 and the outer surface of the inner wall 30. The air outlet 20 is in the form of a generally circular slot centred on, and extending about, the axis X. The width of the slot is preferably substantially constant about the axis X, and is in the range from 0.5 to 5 mm. The overlapping portions of the outer wall 28 and the inner wall 30 are substantially parallel, and are arranged to direct air over the convex rear section 34 of the inner wall 30, which provides a Coanda surface of the nozzle 18. A series of angularly spaced spacers may be provided on one of the facing surfaces of the overlapping portions of the outer wall 28 and the inner wall 30 to engage the other facing surface to maintain a regular spacing between these facing surfaces.

The outer wall 28 and the inner wall 30 define an interior passage 42 for conveying air to the air outlet 20. The interior passage 42 extends about the bore 32 of the nozzle 18. In view of the eccentricity of the walls 28, 30 of the nozzle 18, the cross-sectional area of the interior passage 42 varies about the bore 32. The interior passage 42 may be considered to comprise first and second curved sections, indicated generally at 44 and 46 in FIG. 3, which each extend in opposite angular directions about the bore 32. With reference also to FIGS. 4(b) to 4(d), each section 44, 46 of the interior passage 42 has a cross-sectional area which decreases in size about the bore 32. The cross-sectional area of each section 44, 46 decreases from a first value A1 located adjacent the base 40 of the nozzle 18 to a second value A2 located diametrically opposite the base 40, and where ends of the two sections 44, 46 are joined. The relative positions of the axes X, Y are such that each section 44, 46 of the interior passage 42 has the same variation in cross-sectional area about the bore 32, with the cross-sectional area of each section 44, 46 decreasing gradually from the first value A1 to the second value A2. The variation in the cross-sectional area of the interior passage 42 is preferably such that $A1 \geq 1.5 A2$, and more preferably such that $A1 \geq 1.8 A2$. As shown in FIGS. 4(b) to 4(d), the variation in the cross-sectional area of each section 44, 46 is effected by a variation in the radial thickness of each section 44, 46 about the bore 32; the depth of the nozzle 18, as measured in a direction extending along the axes X, Y is relatively constant about the bore 32. In one example, $A1 \approx 2200$ mm2 and $A2 \approx 1200$ mm2.

The body 12 comprises a substantially cylindrical main body section 50 mounted on a substantially cylindrical lower body section 52. The main body section 50 and the lower body section 52 are preferably formed from plastics material. The main body section 50 and the lower body section 52 preferably have substantially the same external diameter so that the external surface of the main body section 50 is substantially flush with the external surface of the lower body section 52.

The main body section 50 comprises the air inlet 14 through which the primary air flow enters the fan assembly 10. In this embodiment the air inlet 14 comprises an array of apertures formed in the section of the outer casing 16 of the body 12 which is defined by the main body section 50. Alternatively, the air inlet 14 may comprise one or more grilles or meshes mounted within windows formed in the outer casing 16. The main body section 50 is open at the upper end (as illustrated) for connection to the base 40 of the nozzle 18, and to allow the primary air flow to be conveyed from the body 12 to the nozzle 18.

The main body section 50 may be tilted relative to the lower body section 52 to adjust the direction in which the primary air flow is emitted from the fan assembly 10. For example, the upper surface of the lower body section 52 and the lower surface of the main body section 50 may be provided with interconnecting features which allow the main body section 50 to move relative to the lower body section 52 while preventing the main body section 50 from being lifted from the lower body section 52. For example, the lower body section 52 and the main body section 50 may comprise interlocking L-shaped members.

The lower body section 52 is mounted on a base 56 for engaging a surface on which the fan assembly 10 is located. The lower body section 52 comprises the aforementioned user interface and a control circuit, indicated generally at 58, for controlling various functions of the fan 10 in response to operation of the user interface. The lower body section 52 also houses a mechanism for oscillating the lower body section 52 relative to the base 56. The operation of the oscillation mechanism is controlled by the control circuit 58 in response to the user's depression of the button 24 of the user interface. The range of each oscillation cycle of the lower body section 52 relative to the base 56 is preferably between 60° and 120°, and the oscillation mechanism is arranged to perform around 3 to 5 oscillation cycles per minute. A mains power cable (not shown) for supplying electrical power to the fan 10 extends through an aperture formed in the base 56.

The main body section 50 comprises a duct 60 having a first end defining an air inlet 62 of the duct 60 and a second end located opposite to the first end and defining an air outlet 64 of the duct 60. The duct 60 is aligned within the main body section 50 so that the longitudinal axis of the duct 60 is collinear with the longitudinal axis of the body 12, and so that the air inlet 62 is located beneath the air outlet 64.

Figure 5:
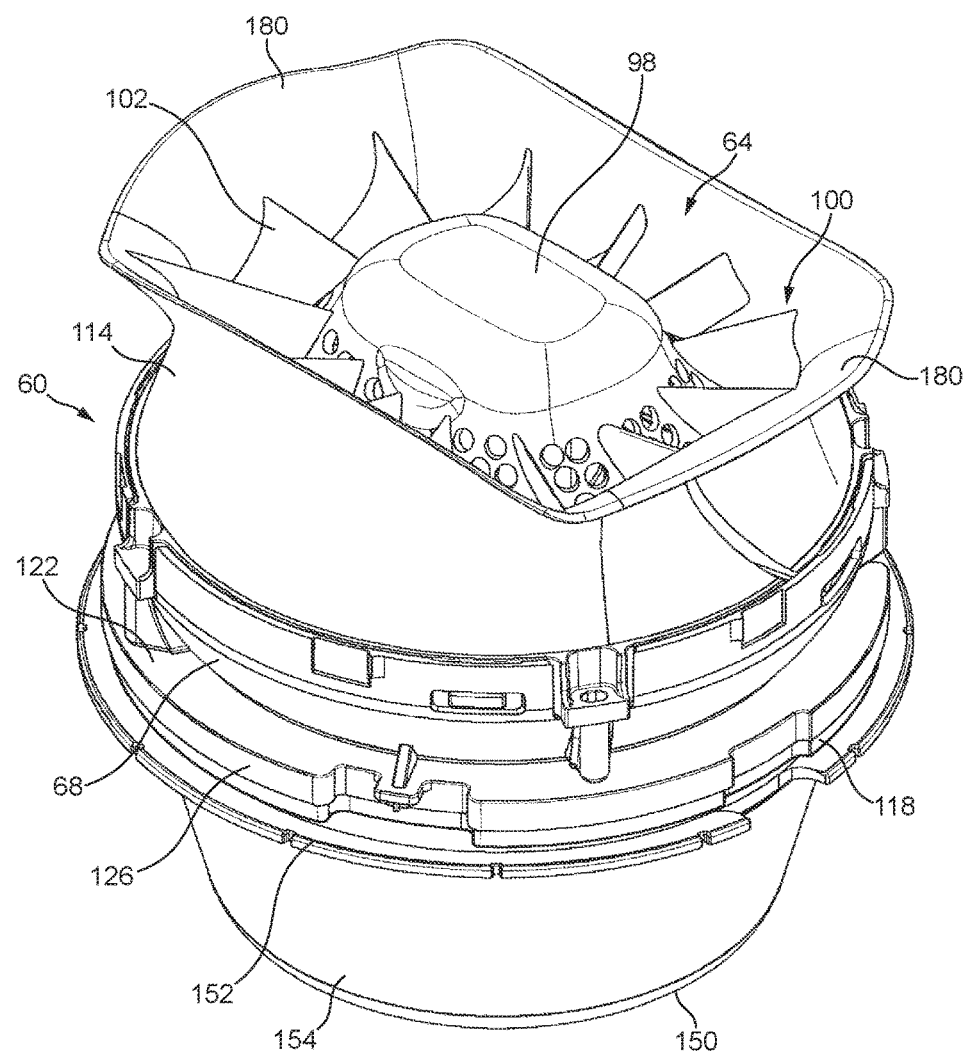
FIG. 5 is a front perspective view of the duct of the body of the fan.
Figure 6:
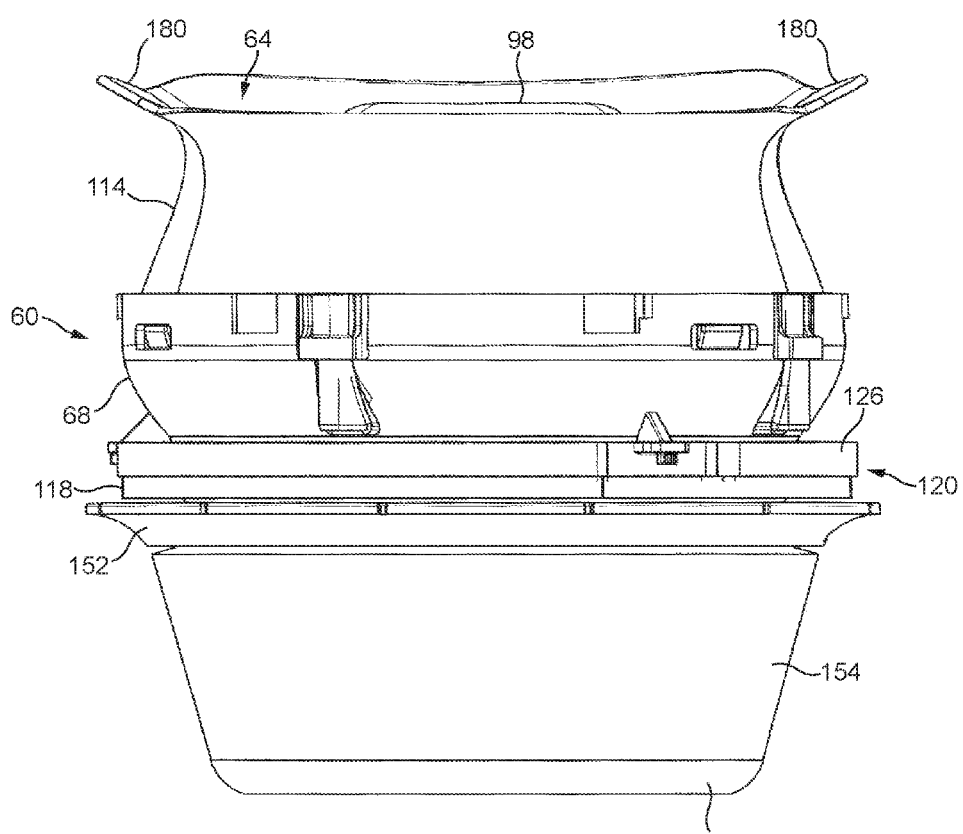
FIG. 6 is a front view of the duct.
Figure 7:
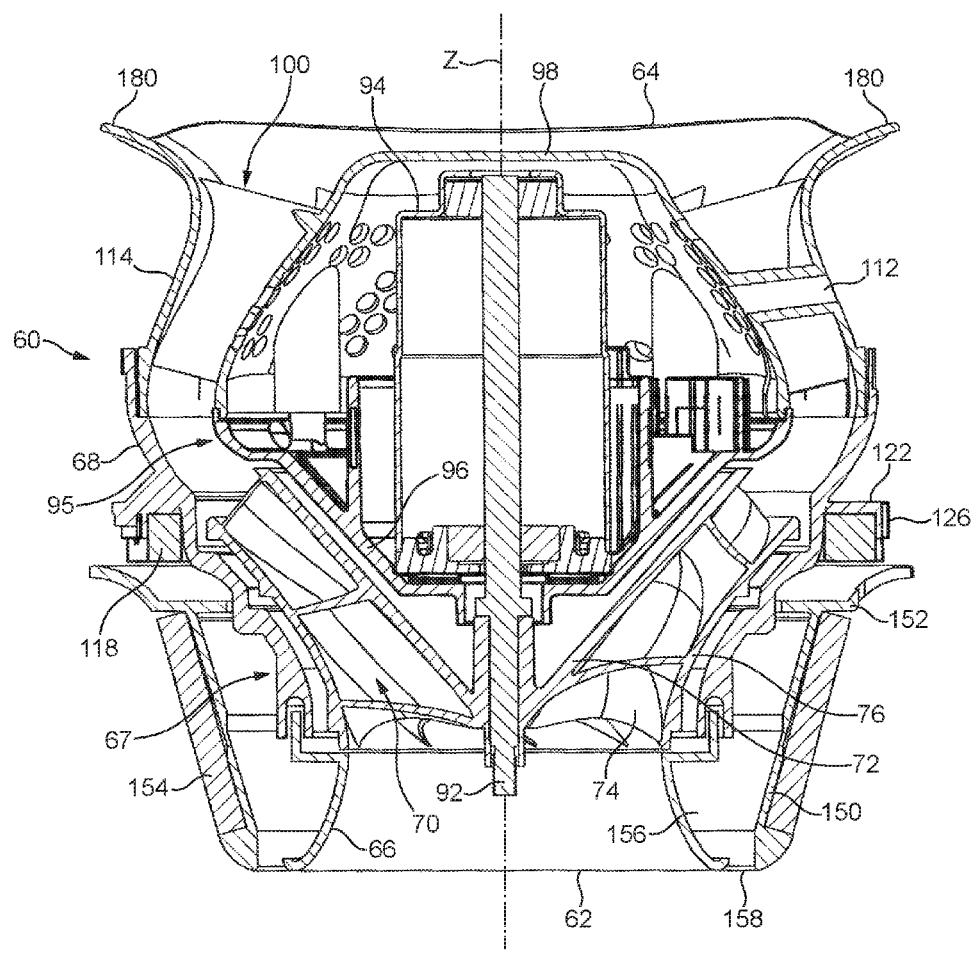
FIG. 7 is a front sectional view of the duct.

The duct 60 is illustrated in more detail in FIGS. 5 to 7. The air inlet 62 is defined by an outwardly flared inlet section 66 of an outer wall 67 of the duct 60. The inlet section 66 of the outer wall 67 is connected to an impeller housing 68 of the outer wall 67. The impeller housing 68 extends about an impeller 70 for drawing the primary air flow into the body 12 of the fan 10. The impeller 70 is a mixed flow impeller. The impeller 70 comprises a generally conical hub 72, a plurality of impeller blades 74 connected to the hub 72, and a generally frusto-conical shroud 76 connected to the blades 74 so as to surround the hub 72 and the blades 74. The blades 74 are preferably integral with the hub 72, which is preferably formed from plastics material.

Figure 8:
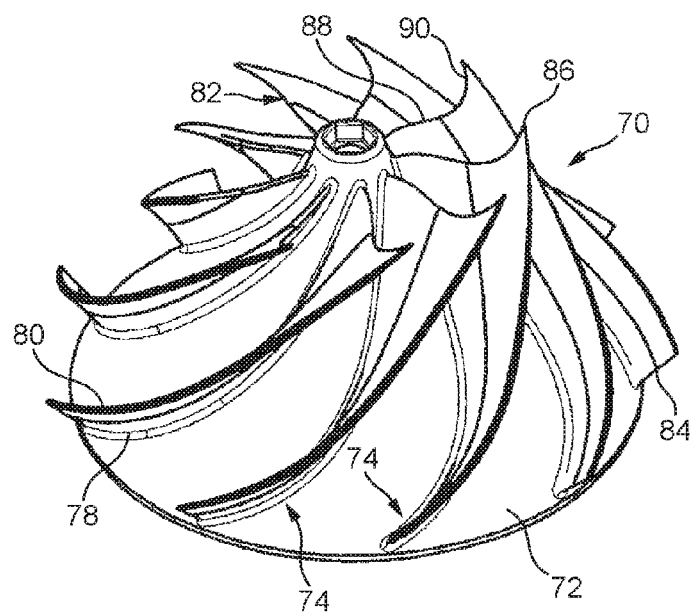
FIG. 8 is a front perspective view of an impeller of the fan, with a shroud removed to reveal the blades of the impeller.
Figure 9:
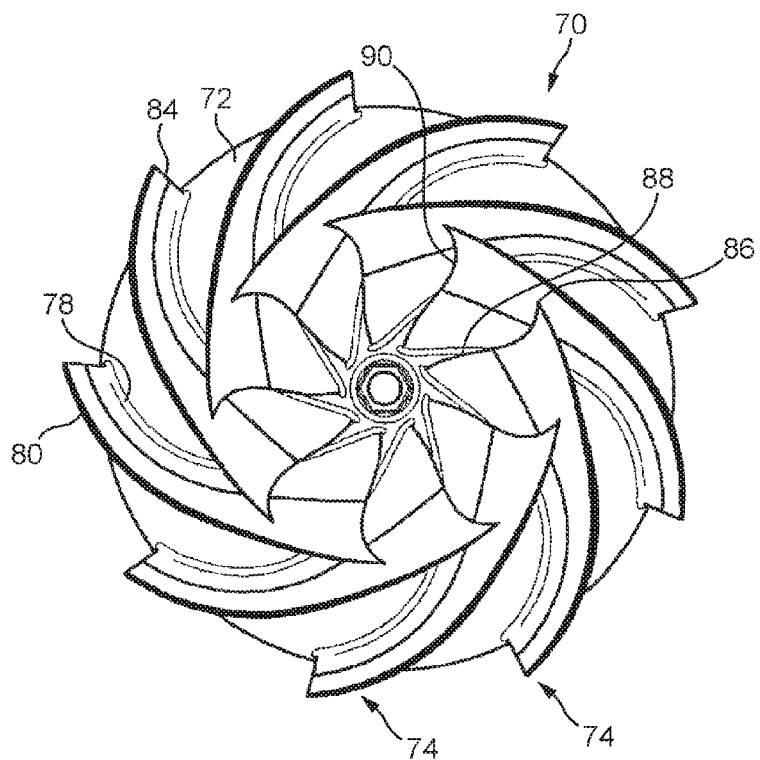
FIG. 9 is a top view of the impeller, with the shroud removed.

The hub 72 and the blades 74 of the impeller 70 are illustrated in more detail in FIGS. 8 and 9. In this example the impeller 70 comprises nine blades 74. Each blade 74 extends partially about the hub 72 by an angle in the range from 60 to 120°, and in this example each blade 74 extends about the hub 72 by an angle of around 105°. Each blade 74 has an inner side edge 78 which is connected to the hub 72, and an outer side edge 80 located opposite to the inner side edge 78. Each blade 74 also has a leading edge 82 located adjacent the air inlet 62 of the duct 60, a trailing edge 84 located at the opposite end of the blade 74 to the leading edge 82, and a blade tip 86 located at the intersection of the leading edge 82 and the outer side edge 80.

The length of each side edge 78, 80 is greater than the lengths of the leading edge 82 and the trailing edge 84. The length of the outer side edge 80 is preferably in the range from 70 to 90 mm, and in this example is around 80 mm. The length of the leading edge 82 is preferably in the range from 15 to 30 mm, and in this example is around 20 mm. The length of the trailing edge 84 is preferably in the range from 5 to 15 mm, and in this example is around 10 mm. The width of the blade 74 decreases gradually from the leading edge 82 to the trailing edge 84.

The trailing edge 84 of each blade 74 is preferably straight. The leading edge 82 of each blade 74 comprises an inner portion 88 located adjacent the hub 72, and an outer portion 90 located adjacent the blade tip 86. The inner portion 88 of the leading edge 82 extends within a range from 30 to 80% of the length of the leading edge 82. In this example the inner portion 88 is longer than the outer portion 90, extending within a range from 50 to 70% of the length of the leading edge 82.

The shape of the blades 74 is designed to minimise noise generated during the rotation of the impeller 70 by reducing pressure gradients across parts of the blades 74. The reduction of these pressure gradients can reduce the tendency for the primary air flow to separate from the blades 74, and thus reduce turbulence within the air flow.

The outer portion 90 of the leading edge 82 is swept forwardly from the inner portion 88 to the blade tip 86. This localised forward sweep of the leading edge 82 of each blade 74 towards the blade tip 86 can reduce the peak hub-to-tip loading of the blades 74. The outer portion 90 is concave in shape, curving forwardly from the inner portion 88 to the blade tip 86. To reduce blade-to-blade loading of the blades 74, the inner portion 88 is swept rearwardly from the hub 72 to the outer portion 90 so that the length of the inner side edge 78 approaches that of the outer side edge 80. In this example the inner portion 88 of the leading edge 82 is convex in shape, curving rearwardly from the hub 72 to the outer portion 90 of the leading edge 82 to maximise the length of the inner side edge 78.

Returning to FIG. 7, the impeller 70 is connected to a rotary shaft 92 extending outwardly from a motor 94 for driving the impeller 70 to rotate about a rotational axis Z. The rotational axis Z is collinear with the longitudinal axis of the duct 60 and orthogonal to the axes X, Y. In this embodiment, the motor 94 is a DC brushless motor having a speed which is variable by the control circuit 58 in response to user manipulation of the dial 26. The maximum speed of the motor 94 is preferably in the range from 5,000 to 10,000 rpm. The motor 94 is housed within a motor housing. The outer wall 67 of the duct 60 surrounds the motor housing, which provides an inner wall 95 of the duct 60. The walls 67, 95 of the duct 60 thus define an annular air flow path which extends through the duct 60. The motor housing comprises a lower section 96 which supports the motor 94, and an upper section 98 connected to the lower section 96. The shaft 92 protrudes through an aperture formed in the lower section 96 of the motor housing to allow the impeller 70 to be connected to the shaft 92. The motor 94 is inserted into the lower section 66 of the motor housing before the upper section 68 is connected to the lower section 66.

The lower section 96 of the motor housing is generally frusto-conical in shape, and tapers inwardly in a direction extending towards the air inlet 62 of the duct 60. The hub 72 of the impeller 70 has a conical inner surface which has a similar shape to that of a contiguous part of the outer surface of the lower section 96 of the motor housing.

Figure 10:
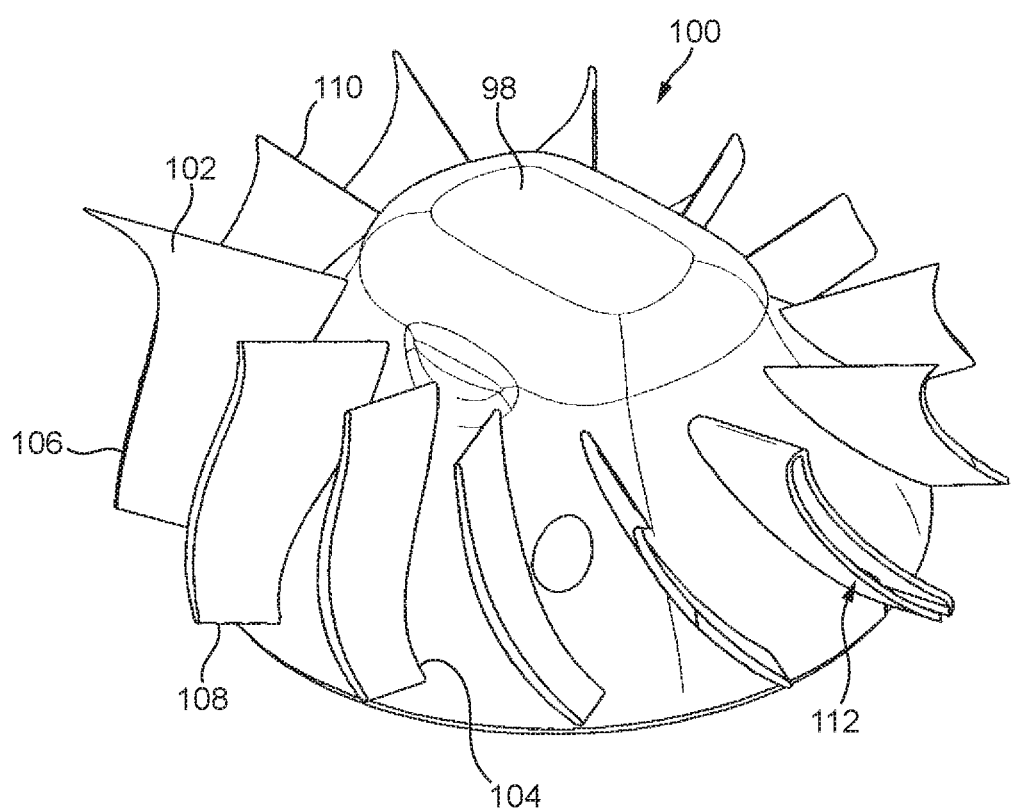
FIG. 10 is a front perspective view of the upper section of the motor bucket of the base of the fan, with the perforations omitted.
Figure 11:
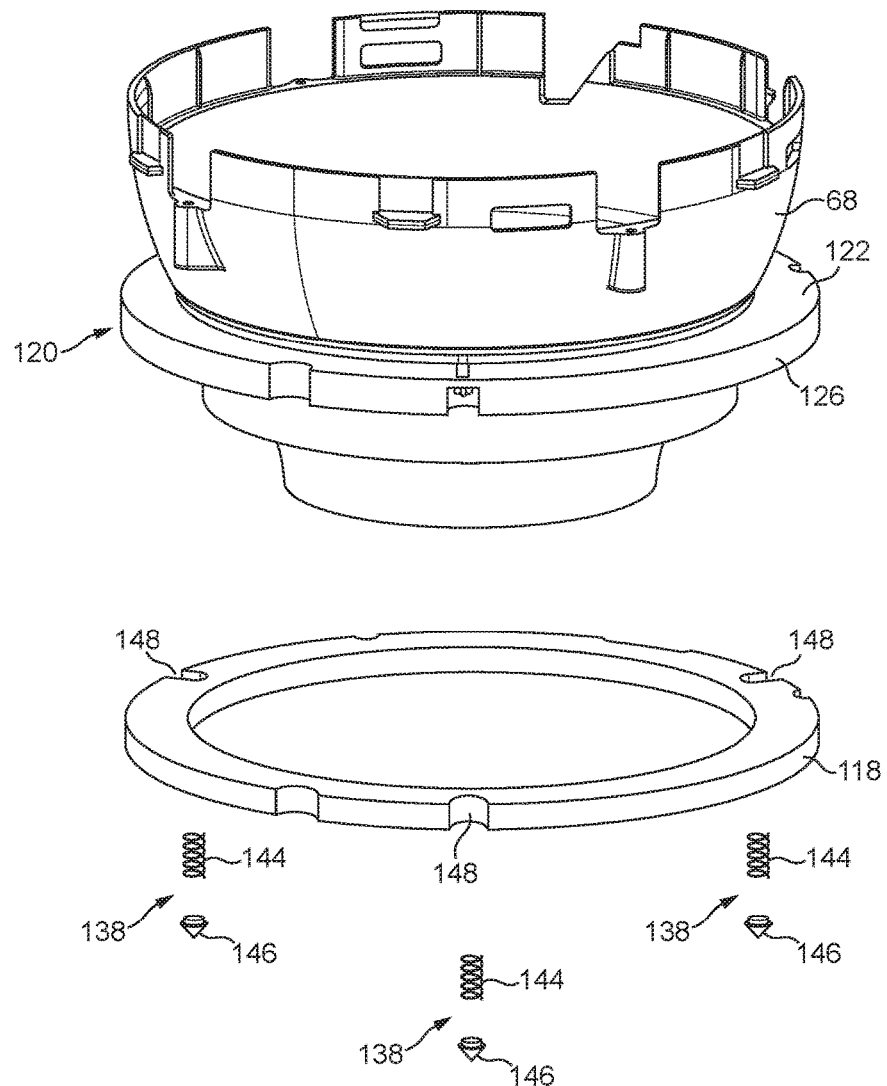
FIG. 11 is an exploded view of the impeller housing of the duct, an annular seal and resilient elements for supporting the duct in the body of the fan.

The upper section 98 of the motor housing is generally frusto-conical in shape, and tapers inwardly towards the air outlet 64 of the duct 60. An annular diffuser 100 is connected to the upper section 98 of the motor housing. The diffuser 100 comprises a plurality of blades 102 for guiding the air flow towards the air outlet 64 of the duct 60. The shape of the blades 102 is such that the air flow is also straightened as it passes through the diffuser 100. As illustrated in FIG. 10 the diffuser 100 comprises 13 blades 102. Each blade 102 has an inner side edge 104 which is connected to, and preferably integral with, the upper section 98 of the motor housing, and an outer side edge 106 located opposite to the inner side edge 104. Each blade 102 also has a leading edge 108 located adjacent the impeller 70, and a trailing edge 110 located at the opposite end of the blade 102 to the leading edge 108. The leading edges 108 of the blades 102 define an inlet end of the diffuser 100, and the trailing edges 110 of the blades 100 define an outlet end of the diffuser 100. One of the blades 102 defines a passageway 112 through which a cable passes to the motor 94.

The outer wall 67 of the duct 60 comprises a diffuser housing 114 connected to the upper end of the impeller housing 68, and which extends about the diffuser 100. The diffuser housing 114 defines the air outlet 64 of the duct 60. The internal surface of the diffuser housing 114 is connected to the outer side edges 106 of the blades 102, for example using an adhesive. The diffuser housing 114 and the upper section 98 of the motor housing define a diffuser section of the air flow path through the duct 60. The diffuser section of the air flow path is thus annular in shape and converges towards the outlet end of the diffuser 100. The diffuser section of the air flow path has a cross-sectional area, as formed from the intersection with the duct 60 of a plane which extends orthogonally through the rotational axis Z of the impeller 70. To generate a smooth air flow through the diffuser 100, the diffuser 100 is shaped so that the variation in the cross-sectional area of the air flow path along the diffuser section is preferably no greater than 20% of the cross-sectional area of the air flow path at the inlet end of the diffuser 100.

Figure 3:
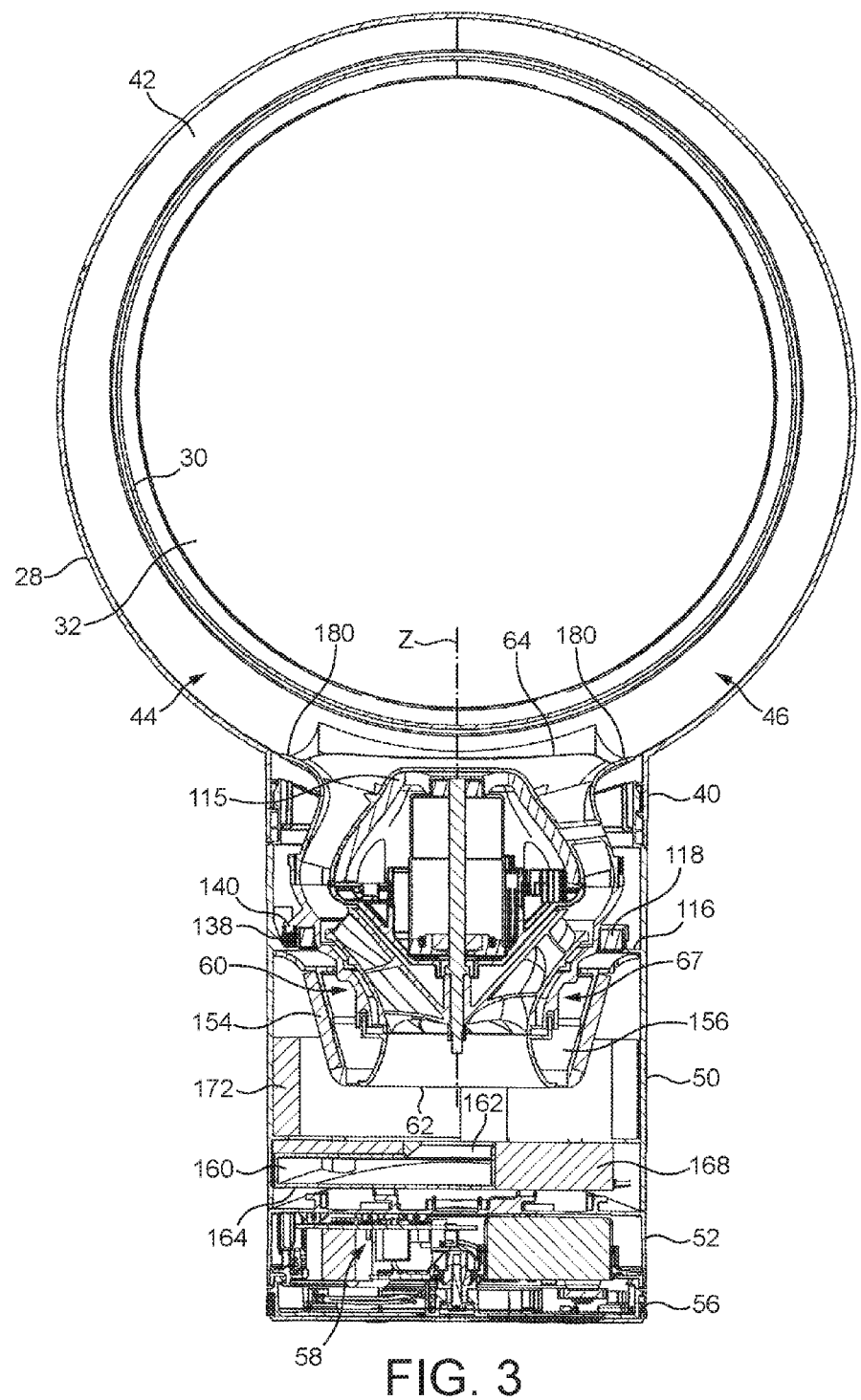
FIG. 3 is a front sectional view through the fan.
Figure 4:
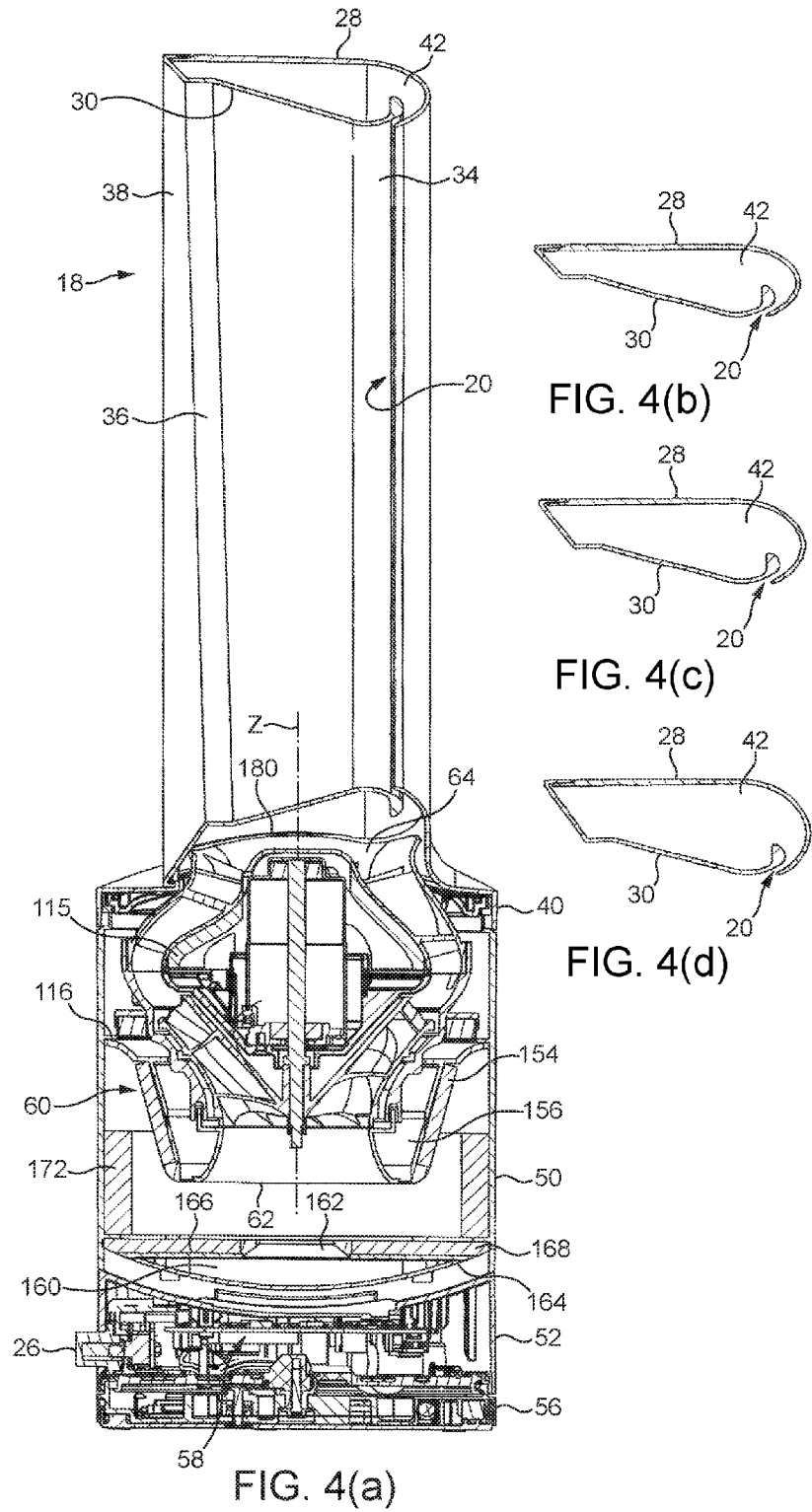
FIG. 4(a) is a side section view of the fan, as viewed along line A-A in FIG. 2.
FIG. 4(b) is a sectional view of part of the nozzle of the fan, as viewed along line B-B in FIG. 2.
FIG. 4(c) is a sectional view of part of the nozzle of the fan, as viewed along line C-C in FIG. 2.
FIG. 4(d) is a sectional view of part of the nozzle of the fan, as viewed along line C-C in FIG. 2.

As shown in FIGS. 5 and 7 the upper section 98 of the motor housing is perforated (the perforations are not illustrated in FIG. 10). The inner surface of the upper section 98 of the motor housing is lined with noise absorbing material 115, preferably an acoustic foam material, to suppress broadband noise generated during operation of the fan 10. The noise absorbing material 115 is not shown in FIG. 7 so as to not obscure the perforations in the upper section 98 of the motor housing, but is illustrated in FIGS. 3 and 4.

The impeller housing 68 is mounted on an annular seat 116 located within the main body section 50 of the body 12. The seat 116 extends radially inwardly from the inner surface of the outer casing 16 so that an upper surface of the seat 116 is substantially orthogonal to the rotational axis Z of the impeller 70.

An annular seal 118 is located between the impeller housing 68 and the seat 116. The annular seal 118 is preferably a foam annular seal, and is preferably formed from a closed cell foam material. In this example, the annular seal 118 is formed from EPDM (ethylene propylene diene monomer) rubber, but the annular seal 118 may be formed from other closed cell foam material which preferably exhibits no more than 0.01 MPa of stress at 10% compression. The outer diameter of the annular seal 118 is preferably smaller than the inner diameter of the outer casing 16 so that the annular seal 118 is spaced from the inner surface of the outer casing 16.

The annular seal 118 has a lower surface which is in sealing engagement with the upper surface of the seat 116, and an upper surface which is in sealing engagement with the impeller housing 68. In this example, the impeller housing 68 comprises a recessed seal engaging section 120 extending about an outer wall of the impeller housing 68. The seal engaging section 120 of the impeller housing 68 comprises a flange 122 which defines an annular channel for receiving the annular seal 118. The flange 122 extends radially outwardly from the outer surface of the impeller housing 68 so that a lower surface of the flange 122 is substantially orthogonal to the rotational axis Z of the impeller 70. The internal periphery of a circumferential lip 126 of the flange 122 and the external periphery of the annular seal 118 are preferably scalloped or otherwise shaped to define a plurality of recesses to inhibit relative rotation between the impeller housing 68 and the annular seal 118.

The seat 116 comprises an aperture to enable a cable (not shown) to pass from the control circuit 58 to the motor 94. Each of the flange 122 of the impeller housing 68 and the annular seal 118 is shaped to define a respective recess to accommodate part of the cable. One or more grommets or other sealing members may be provided about the cable to inhibit the leakage of air through the aperture, and between the recesses and the internal surface of the outer casing 16.

A plurality of resilient supports 138 are also provided between the impeller housing 68 and the seat 116 for bearing part of the weight of the duct 60, the impeller 70, the motor 94, and the motor housing. The resilient supports 138 are equally spaced from, and equally spaced about, the longitudinal axis of the main body section 50. Each resilient support 138 has a first end which is connected to a respective mount 140 located on the flange 122 of the impeller housing 68, and a second end which is received within a recess formed in the seat 116 to inhibit movement of the resilient support 138 along the seat 116 and about the longitudinal axis of the main body section 50. In this example, each resilient support 138 comprises a spring 144 which is located over a respective mount 140, and a rubber foot 146 which is located with a respective recess of the seat 116. Alternatively, the spring 144 and the foot 146 may be replaced by a rod or shaft formed from rubber or other elastic or elastomeric material. As a further alternative, the plurality of resilient supports 138 may be replaced by a single annular resilient support extending about the annular seal 118. In this example, the external periphery of the annular seal 118 is further scalloped or otherwise shaped to form a plurality of recesses 148 each for at least partially receiving a respective resilient support 138. This allows the resilient supports 138 to be located closer to the longitudinal axis of the main body section 50 without either decreasing the radial thickness of the annular seal 118 or increasing the diameter of the main body section 50.

A guide member 150 is provided about the inlet section 66 and the lower end of the impeller housing 68 for guiding the air flow entering the body 12 towards the air inlet 62 of the duct 60. The guide member 150 is generally frusto-conical in shape, and tapers inwardly towards the base 56 of the body 12. The guide member 150 defines in part a tortuous air flow path between the air inlet 14 of the body 12 and the air inlet 62 of the duct 60, and so serves to block any direct path for noise passing from the air inlet 62 of the duct 60 towards the air inlet 14 of the body 12. The guide member 150 depends from an annular rib 152 extending about the impeller housing 68. The outer periphery of the rib 152 may be connected to the inner surface of the main body section 50, for example using an adhesive. Alternatively, the inner periphery of the rib 152 may be connected to the outer surface of the impeller housing 68. The outer surface of the guide member 150 which is exposed to the air flow passing through the body 12 is lined with sound-absorbing material 154.

The guide member 150 is spaced from the external surface of the duct 60 to define an annular noise suppression cavity 156. The size of the cavity 156 is tuned to the wavelength of the rotational tone of the impeller 70 so that the cavity 156 can act as a resonator to target a specific wavelength of the noise generated during the use of the fan 10, as well as generally reduce noise levels. The cavity 156 has an inlet 158 located between the air inlet 62 of the duct 60 and the guide member 150. The inlet 158 is annular in shape, and located at the lowermost extremity of the cavity 156. With reference to FIGS. 3 and 4, the inlet 158 is positioned at a location where the tortuous section of the air flow path turns through an angle which is greater than 90° from a direction extending away from the air inlet 14 of the body 12, and towards the rotational axis Z of the impeller 70, to a direction extending towards the air inlet 62 of the duct 60.

In addition to the cavity 156, or as an alternative to that cavity 156, the main body section 50 comprises a noise suppression cavity 160 located beneath the air inlet 62 of the duct 60. The cavity 160 is also tuned to the wavelength of the rotational tone of the impeller 70. The cavity 160 has an inlet 162 which is located beneath the air inlet 62 of the duct 60, and which is preferably concentric with the air inlet 62 of the duct 60. A lower wall of the cavity 160 is defined by a concave lower surface 164 of the main body section 50. The inlet 162 and an upper wall of the cavity 160 are defined by an annular plate 166 which is connected to the upper peripheral portion of the lower surface 164 of the main body section 50.

To reduce the level of broadband noise emitted from the fan 10, an annular sound absorbing member 168 is preferably located between the duct 60 and the cavity 160. The annular sound absorbing member 168 is concentric with the inlet 162 of the cavity 160, and has an outer periphery which is in contact with the inner surface of the outer casing 16. A sheet of sound absorbing material may be disposed over the annular sound absorbing member 168 to inhibit the ingress of dust into the cavity 160. The inner surface of the outer casing 16 is partially lined with sound absorbing material. For example, a sheet of sound-absorbing material 172 may be located immediately downstream of the air inlet 14 to reduce the level of broadband noise emitted through the air inlet 14 of the body 12.

To operate the fan 10 the user presses button 22 of the user interface, in response to which the control circuit 58 activates the motor 94 to rotate the impeller 70. The rotation of the impeller 70 causes a primary air flow to be drawn into the body 12 through the air inlet 14. The user may control the speed of the motor 94, and therefore the rate at which air is drawn into the body 12 through the air inlet 14, by manipulating the dial 26.

The rotation of the impeller 70 by the motor 94 generates vibrations which are transferred through the motor housing and the impeller housing 68 towards the seat 116. The annular seal 118 located between the impeller housing 68 and the seat 116 is compressed under the weight of the duct 60, the impeller 70, the motor housing and the motor 94 so that it is in sealing engagement with the upper surface of the seat 116 and the lower surface of the flange 122 of the impeller housing 68. The annular seal 118 thus not only prevents the primary air flow from returning to the air inlet 62 of the duct 60 along a path extending between the inner surface of the outer casing 16 of the main body section 50 and the outer wall 67 of the duct 60, but also reduces the transmission of these vibrations to the seat 116, and thus to the body 12 of the fan 10. The presence of the resilient supports 138 between the impeller housing 68 and the seat 116 inhibits any over-compression of the annular seal 118 over time, which otherwise could increase the transmission of vibrations through the annular seal 118 to the seat 116. The flexibility of the resilient supports 138 allows the resilient supports 138 to flex both axially and radially relative to the seat 116, which reduces the transmission of vibrations to the seat 116 through the resilient supports 138. The annular seal 118 serves to damp the flexing movement of the resilient supports 138 relative to the seat 116.

The sound absorbing material 115, 154, 172 and the annular sound absorbing member 168 serve to dampen broadband noise generated within the body 12 of the fan 10. The guide member 150 serves to prevent noise from passing directly from the air inlet 62 of the duct 60 to the external environment via the air inlet 14 of the body 12. Undesirable tones generated by the rotational of the impeller 70 are reduced by the cavities 156, 160.

The rotation of the impeller 70 causes a primary air flow to enter the body 12 through the air inlet 14, and to pass along the tortuous section of the air flow path to the air inlet 62 of the duct 60. Within the duct 60, the primary air flow passes through the impeller housing 68 and the diffuser housing 114 to be emitted from the air outlet 64 of the duct 60. Returning to FIGS. 5 to 7, the end of the duct 60 in which the air outlet 64 is formed comprises two outwardly flared portions 180. The duct 60 is shaped so that when the duct 60 is mounted on the seat 116 this end of the duct 60 protrudes from the open upper end of the main body section 50 of the body 12. As a result, the flared portions 180 of the duct 60 are located within the interior passage 42 of the nozzle 18.

Within the interior passage 42, the primary air flow is divided into two air streams which pass in opposite angular directions around the bore 32 of the nozzle 18, each within a respective section 44, 46 of the interior passage 42. The flared portions 180 of the duct 60 are each shaped to guide a respective air stream into a respective section 44, 46 of the interior passage 42. As shown in FIG. 3, the ends of the flared portions 180 of the duct 60 have a curvature which is substantially the same as that of the contiguous portions of the outer wall 28 of the nozzle 16. The separation between the end of each flared portion 180 and its contiguous portion of the outer wall 28 of the nozzle 16 is preferably no greater than 10 mm, more preferably no greater than 5 mm so that there is minimal disruption to the profile of the air flow as it enters the interior passage 42 of the nozzle 16.

As the air streams pass through the interior passage 42, air is emitted through the air outlet 20. The emission of the primary air flow from the air outlet 20 causes a secondary air flow to be generated by the entrainment of air from the external environment, specifically from the region around the nozzle 18. This secondary air flow combines with the primary air flow to produce a combined, or total, air flow, or air current, projected forward from the nozzle 18.

The invention claimed is:

1. A fan for generating an air current, comprising:
a body comprising an air inlet; and
a nozzle connected to the body;
the nozzle comprising an interior passage for receiving an air flow from the body and at least one air outlet from which the air flow is emitted from the fan, the interior passage extending about an opening through which air from outside the nozzle is drawn by air emitted from the at least one air outlet;
the body comprising a duct having an air inlet and an air outlet, an impeller located within the duct for drawing the air flow through the duct, and a motor for rotating the impeller about a rotational axis, the body defining an air flow path extending from the air inlet of the body to the air outlet of the duct;
wherein the body further comprises an annular guide member extending about the duct for guiding air from the air inlet of the body to the air inlet of the duct, and wherein the guide member defines with the duct at least part of an annular noise suppression cavity,
wherein the duct comprises an inner wall and an outer wall extending about the inner wall, and wherein a portion of the inner wall of the duct is perforated and lined internally with sound-absorbing material, and
wherein the perforated portion of the inner wall is frusto-conical in shape, and tapers towards the outlet of the duct.

2. The fan of claim 1, wherein the noise suppression cavity has an inlet at least partially defined by the guide member.

3. The fan of claim 2, wherein the inlet of the noise suppression cavity is located between the air inlet of the duct and the guide member.

4. The fan of claim 1, wherein the guide member is inclined relative to the rotational axis of the impeller.

5. The fan of claim 1, wherein the guide member is conical in shape.

6. The fan of claim 1, wherein the guide member depends from an annular rib extending between the body and the duct.

7. The fan of claim 1, wherein the air inlet of the body comprises an array of apertures which extends about the guide member.

8. The fan of claim 1, wherein the guide member defines in part a tortuous air flow path between the air inlet of the body and the air inlet of the duct.

9. The fan of claim 1, wherein the body comprises an annular sound-absorbing member located beneath the guide member.

10. The fan of claim 9, wherein the guide member and the annular sound-absorbing member are concentric.

11. The fan of claim 1, wherein a section of the duct adjacent the perforated portion of the inner wall houses a diffuser.

12. The fan of claim 11, wherein the diffuser is configured to support the inner wall within the outer wall.

13. The fan of claim 1, wherein the inner wall of the duct forms at least part of a motor housing for housing the motor.

14. The fan of claim 1, wherein the duct is mounted on an annular seat located within the body, the body comprising an annular seal in sealing engagement with the duct and the seat.

15. The fan of claim 14, wherein the seal is a foam annular seal.

16. The fan of claim 1, wherein the impeller is a mixed flow impeller.

17. The fan of claim 1, wherein the impeller comprises a conical hub connected to the motor, and a plurality of blades connected to the hub, each blade comprising a leading edge located adjacent the air inlet of the impeller housing, a trailing edge, an inner side edge connected to and extending partially about the outer surface of the hub, an outer side edge located opposite to the inner side edge, and a blade tip located at the intersection of the leading edge and the outer side edge, and wherein the leading edge comprises an inner portion located adjacent the hub, and an outer portion located adjacent the blade tip, and wherein the inner portion is swept rearwardly from the hub to the outer portion, and the outer portion is swept forwardly from the inner portion to the blade tip.

18. The fan of claim 1, wherein the air outlet of the duct protrudes from the body into the interior passage of the nozzle.

* * * * *